(12) United States Patent
Saito et al.

(10) Patent No.: US 6,320,740 B1
(45) Date of Patent: Nov. 20, 2001

(54) METHOD FOR MANUFACTURING A POLARIZED ELECTRODE FOR AN ELECTRIC DOUBLE-LAYER CAPACITOR

(75) Inventors: Takashi Saito; Yukari Kibi; Ryuichi Kasahara, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/496,375

(22) Filed: Feb. 2, 2000

(30) Foreign Application Priority Data

Feb. 3, 1999 (JP) .................................................. 11-025673

(51) Int. Cl.$^7$ ....................................................... H01G 9/00
(52) U.S. Cl. ...................... 361/502; 429/231.8; 429/232; 429/217; 29/25.03
(58) Field of Search ........................... 361/502; 29/25.03; 429/231.8, 232, 217

(56) References Cited

U.S. PATENT DOCUMENTS

| | | | | |
|---|---|---|---|---|
| 4,605,989 | * | 8/1986 | Marse et al. | 361/433 |
| 5,172,307 | * | 12/1992 | Tabuchi et al. | 361/502 |
| 5,303,118 | * | 4/1994 | Saito et al. | 361/502 |
| 5,538,811 | * | 7/1996 | Kanbara et al. | 429/192 |
| 6,002,765 | * | 12/1999 | Maeda et al. | 361/502 |
| 6,099,989 | * | 8/2000 | Harada et al. | 429/213 |

FOREIGN PATENT DOCUMENTS

| | | | |
|---|---|---|---|
| 5-217803 | * | 8/1993 | (JP) . |
| 5-217804 | * | 8/1993 | (JP) . |
| 7-91449 | | 10/1995 | (JP) ................. C08L/65/00 |
| 57-60828 | | 4/1982 | (JP) ................. H01G/9/00 |
| 60-216527 | | 10/1985 | (JP) ................. H01G/9/00 |
| 3/80518 | | 4/1991 | (JP) ................. H01G/9/00 |
| 3/241809 | | 10/1991 | (JP) ................. H01G/9/00 |
| 3/283521 | | 12/1991 | (JP) ................. H01G/9/00 |
| 6-5467 | | 1/1994 | (JP) ................. H01G/9/00 |
| 7-161589 | | 6/1995 | (JP) ................. H01G/9/058 |
| 7-70448 | | 7/1995 | (JP) ................. H01G/9/058 |
| 8-97102 | | 4/1996 | (JP) ................. H01G/9/058 |
| 9-270370 | | 10/1997 | (JP) ................. H01G/9/058 |

* cited by examiner

*Primary Examiner*—Charles Bowers
*Assistant Examiner*—Erik Kielin
(74) *Attorney, Agent, or Firm*—Hayes, Soloway, Hennessey, Grossman & Hage, P.C.

(57) ABSTRACT

A method for fabricating an electric double-layer capacitor includes the steps of contacting a polarized electrode which includes a polymer having no bridge structure therein and activated carbon and a collector which includes a polymer and conductive additives, exposing the polarized electrode and the collector to electron beam to form a bridge structure therebetween. The electric double-layer capacitor having the polarized electrode and the collector thus formed has a low equivalent serial resistance and can be manufactured with a higher throughput.

9 Claims, 5 Drawing Sheets

METHOD FOR MANUFACTURING A POLARIZED ELECTRODE FOR AN ELECTRIC DOUBLE-LAYER CAPACITOR

FIELD OF THE INVENTION

The present invention relates to a method for manufacturing a polarized electrode for an electric double-layer capacitor having an electrolytic solution.

DESCRIPTION OF A RELATED ART

The electric double-layer capacitor uses an electric double-layer generated in the interface between a polarized electrode and the electrolytic solution for storing electric charge in the interface. The electric double-layer has a thickness on the order of as low as several nanometers (nm), and the polarized electrode thereof can be made from a material, such as activated carbon, having a large specific surface area for achieving a large electric capacity. Since the materials for the electric double-layer capacitor do not include any harmful stuff such as heavy metals, it has the advantage of less environmental burdens. In addition, it has a large lifetime against the iterative charge and discharge thereof due to no chemical reaction accompanied thereby differently from the secondary cells. Thus, the electric double-layer capacitor has been expected to have variety of potential applications such as a backup electric source for a microcomputer, a memory device etc. in place of the secondary cell.

The current electric double capacitor has a larger electric capacity and a lower internal resistance due to the recent invention of an activated carbon/polyacene composite material (Patent Publication JP-B-7-91449) and the development of the process for forming an activated carbon layer on an aluminum foil by using a binder such as described in JP-A-57-60828. Thus, electric double-layer capacitor now has wide actual applications for power uses such as for an energy recovery in a hybrid motor car or an electric vehicle, alleviation of fluctuation in the power source generated by photovoltaic generation or wind power generation, backup source against instantaneous service interruption, rash current source during start of a motor, and alleviation of the load fluctuation in the fuel power system.

It is desired that the electric double-layer capacitor have a lower internal resistance because these applications require a high-speed charge/discharge function wherein a power of several hundreds of kilowatts to several tens of kilowatts, for example, is charged or discharged in a very short time, e.g., several seconds.

The electric double-layer capacitors are generally classified depending on the electrolytic solution thereof into two types: an aqueous solution system such as including sulfuric acid or potassium hydroxides; and an organic solution system including organic solvents and quaternary ammonium salts as the electrolyte thereof. The two types have different electric characteristics, different constituent elements and different structures. The aqueous solution system has the disadvantage of lower breakdown voltage as low as 1 volt compared to 3 volts of the organic solution system, and yet has the advantage of lower internal resistance due to the low resistivity of the electrolytic solution. However, low-cost metals such as aluminum cannot be used in the aqueous solution system and can be used in the organic system. This allows the organic solution system to have a winding structure, wherein a collector made of an aluminum foil is used for winding the polarized electrode, or a coin cell structure having a stainless steel foil. On the other hand, the aqueous solution system has a laminated structure wherein rubber or plastics is used as a basic material.

FIG. 1 shows a sectional view of a conventional electric double-layer capacitor including a single basic cell having an aqueous solution as an electrolyte. A pair of polarized electrodes 11 are made from a material having a large specific surface area, an electric conductivity, and a chemical stability. The material for the polarized electrode 11 may be selected from materials having a specific surface area of 500 to 2500 $m^2$/gram, such as activated carbon powder or fibers, activated carbon powder or fibers combined (bound) by a binder such as fluorine-based material, a solid active carbon obtained by binding activated carbon powder or fibers with carbon as described in Patent Publication JP-B-7-70448, and an activated carbon/polyacene composite material prepared by binding activated carbon powder or fibers by using polyacene.

A collector 12 electrically connects the polarized electrode 11 to the external circuit while preventing leakage of the electrolytic solution. The collector 12 is made from a butylene-isoprene rubber (butyl rubber) or elastomer by adding carbon thereto for electric conductivity. The collector 12 generally has a thickness equal to or less than 500 $\mu$m and a specific resistivity equal to or less than 10 $\Omega$-cm.

A separator 13 separates the pair of polarized electrodes 11 for prevention of a short-circuit failure or contact therebetween, while passing therethrough electrolytic ions. The separator 13 is generally made from nonwoven fabric or porous film. Plastic material including polypropylene or polyethylene, if used for the separator 13, may be added with a surface active agent or silica to have a hydrophilic property.

A gasket 14 is used as a structural material for preventing a short-circuit failure between the pair of collectors 12 and leakage of the electrolytic solution. The gasket 14 may be made from plastics, butyl rubber or elastomer. The plastics, if used for the gasket 14, may be bonded to the collectors 12 by using a epoxy resin adhesive. The butyl rubber or elastomer, if used for the gasket 14, may be cured at a temperature of 100 to 130° C., as described in JP-A-60-216527, to be bonded to the collectors 12.

The breakdown voltage or operating voltage of the electric double-layer capacitor is limited by the electrolysis of water and is generally around 1 volt. To obtain a desired breakdown voltage, a specified number of electric double-layer capacitors are connected in series. In this case, either a stacked structure wherein the basic cells are stacked one on another or a bipolar structure wherein a single collector is used in common for a pair of basic cells disposed on both surfaces of the collector, as described in JP-A-6-5467, may be used.

The polarized electrode 11, if made from activated carbon powder or fibers or made as a solid body by binding activated carbon powder or fibers with a binder such as fluorine-based material, should be subjected to a fastening pressure of 10 kg/$cm^2$ or more to reduce the contact resistance between the powder or fibers and the contact resistance between the polarized electrode 11 and the collector 12. The electric double-layer capacitor 10 has a smaller internal resistance along with a larger opposing area between the pair of polarized electrodes 11. However, an electric double-layer capacitor having a lower internal resistance is difficult to handle because of large dimensions thereof which are required for maintaining the pressure. On the other hand, an activated carbon/carbon composite material wherein activated carbon powder or fibers are bound with carbon, or an activated carbon/polyacene composite material wherein activated carbon powder or fibers are bound with polyacene can provide a suitable specific resistivity. for the electric double-layer capacitor as low as several tens of $\Omega$-cm or less, whereby the electric double-layer capacitor thus fabricated has a higher electric capacity and a lower internal resistance.

The activated carbon/carbon composite material or the activated carbon/polyacene composite material has a high rigidity, and thus a lower transformation capability. As a result, the polarized electrode 11 made from these materials has a smaller contact area with respect to the collector 12 in the case of a low surface flatness of the polarized electrode 11, whereby the contact resistance between the polarized electrode and the collector is higher compared to the contact resistance between the collector and the activated carbon powder or fibers. In view of the above, the electric contact between the polarized electrode and the collector is generally maintained by applying a pressure of as high as several kilograms per square centimeters ($kg/cm^2$) therebetween or by bonding them with, for example, an organic binder.

In Patent Publications JP-A-7-161589, JP-A-9-270370 and JP-A-8-97102, for example, it is described that the polarized electrode and the collector are bonded with a conductive adhesive. In Patent Publications JP-A-3-283521 and JP-A-3-241809, it is described that the collector is softened by heating or a solvent. In Patent Publication JP-A-3-080518, it is described that activated carbon powder is interposed between the polarized electrode and the collector for the purpose of improving the flatness of the polarized electrode to thereby increase the contact area therebetween.

Formation of a bridge structure in the polymer or vulcanization of the polymer is generally conducted by using a heat treatment in several technical fields, and also in fabrication of the electric double-layer capacitor. The heat treatment for this purpose is performed at a temperature of 100° C. or higher in the electric double-layer capacitor while preventing leakage of the electrolytic solution therefrom. In addition, the lower speed of the bridging reduces the throughput of the fabrication and increases the energy consumption in the fabrication.

Formation of the bridge structure in the polymer or vulcanization of the polymer is also performed in specific fields by using an electron beam exposure system. The recent improvement of the electron beam exposure in its performance and efficiency allows the electron beam exposure to be used for improvement of heat resistance in a tube or the cover of an electric wire, and for fabrication of rubber or tire. Exposure of polymers to a ray may cause generation or destruction of a bridge (cross-link) structure therein depending on the property of the polymers. A polyvinyl-type main chain in the polymer generates the bridge structure therein and a vinylidene-type main chain in the polymer destructs the bridge structure therein.

More specifically, the bridge structure is generated by the electron beam exposure in polyethylene (PE), polypropylene (PP), chloroprene rubber (CR), butadiene rubber (BR), acrylic rubber (ACM), acrylonitrile-butadiene rubber (NBR), ethylene propylene rubber (EPR), isoprene rubber (IR), styrene butadiene rubber (SBR), natural rubber (NR), silicone rubber, ethylene propylene copolymer (EPM), ethylene propylene-diene copolymer (EPDM), polyamide, polyester, polystyrene, chlorinated polyethylene (CPE), and composites of these materials.

The conventional polarized electrode, as described above, has a problem in that there is a large contact resistance between particles or fibers in the activated carbon and between the polarized electrode and the collector. The contact resistance may be reduced to some, extent by applying a high thrust pressure or by using a binder. However, since there is a limit in the reduction, reduction of the contact resistance by the, function of the polarized electrode itself has been desired.

SUMMARY OF THE INVENTION

It is an object of the present invention to provide a method for manufacturing a polarized electrode for use in an electric double-layer capacitor, which is capable of reducing the contact resistance in the activated carbon powder or fibers and the contact resistance between the polarized electrode and the collector in the electric double-layer capacitor.

The present invention provides, in a first aspect thereof, a method for manufacturing a polarized electrode for use in an electric double-layer capacitor, comprising the steps of admixing a polymer having substantially no bridge structure therein and activated carbon (either powder or fibers) to obtain a mixture, and bridging the polymer and the activated carbon in the mixture by an electron beam exposure.

The present invention also provides, in a second aspect thereof, a method for manufacturing an electric double-layer capacitor, comprising the steps of preparing a polarized electrode body including a first polymer having substantially no bridge structure therein and activated carbon, preparing a collector body including a second polymer having substantially no bridge structure therein and conductive additives, disposing the polarized electrode body on the collector body to form a combination, and exposing the combination to an electron beam to form a bridge structure at least between the polarized electrode body and the collector body, and fastening a plurality of the exposed combination, with electrolytic solution disposed between each two of the combination, to form an electric double-layer capacitor.

In accordance with the method of the present invention, the bridge structure formed by the electron beam exposure reduces the internal resistance of the resultant electric double-layer capacitor for improving the electric characteristics thereof, and improves the throughput of the fabrication of the electric double-layer capacitor.

The above and other objects, features and advantages of the present invention will be more apparent from the following description, referring to the accompanying drawings.

PREFERRED EMBODIMENTS OF THE INVENTION

Figure 1:
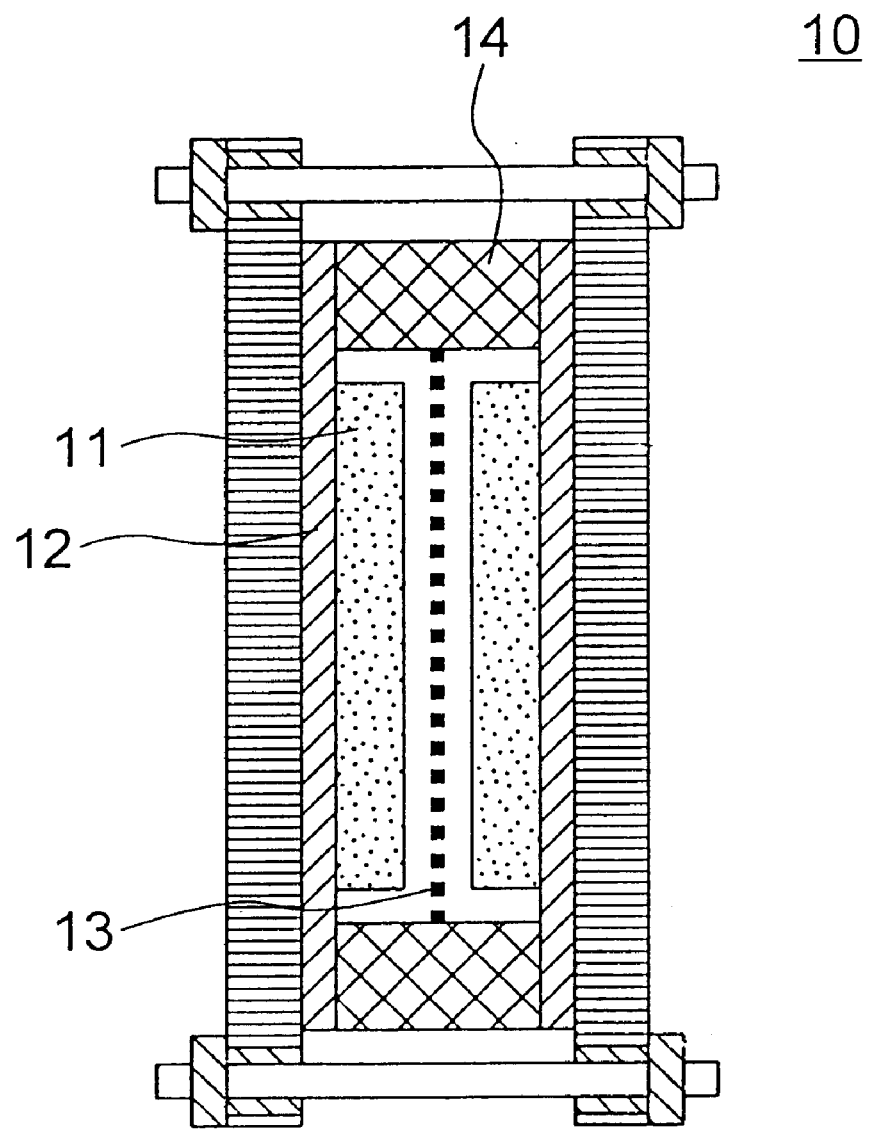
FIG. 1 is a sectional view of a basic cell of a conventional electric double-layer capacitor.

Now, the present invention is more specifically described with reference to accompanying drawings, wherein similar constituent elements are designated by similar reference numerals.

Figure 2:
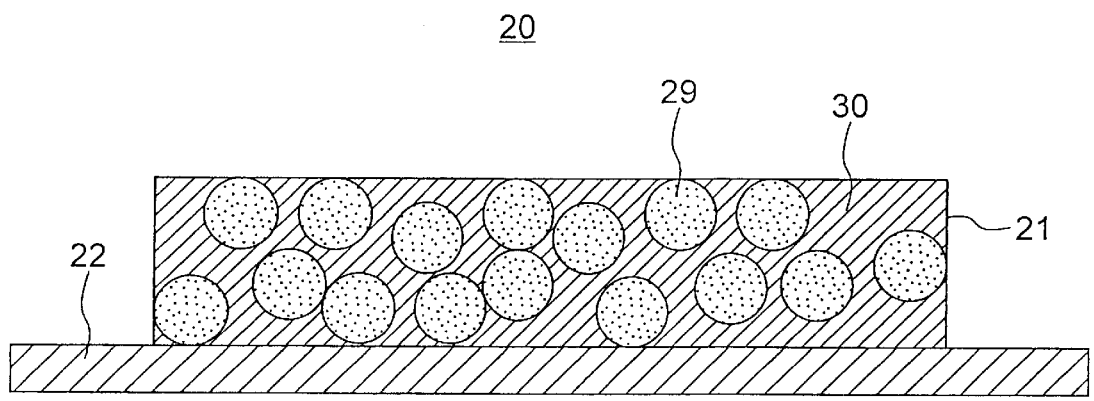
FIG. 2 is a sectional view of a combination of a polarized electrode and a collector for use in an electric double-layer capacitor formed by a method according to an embodiment of the present invention.

Referring to FIG. 2, there is shown a combination 20 of a polarized electrode 21 and a collector 22, which are coupled to form a unitary body. The polarized electrode 21 and the collector 22 are bonded by a bridge structure formed therebetween by an electron beam exposure. The body of the polarized electrode 21 includes activated carbon powder or fibers 29 and a polymer 30 having no bridge structure therein before an electron beam exposure. The body of the collector 22 includes a polymer having no bridge structure therein before the electron beam exposure and a conductive additive for adding an electric conductivity to the polymer. The polymer in the polarized electrode 21 and the polymer in the collector 22 may be selected from different polymers or the same polymer. The electron beam exposure may be conducted to the polarized electrode body for reduction of the contact resistance between the particles or fibers in the activated carbon. The electron beam exposure may be conducted to the combination of the polarized electrode body having no bridge therein and the collector body having no bridge therein while fixing the polarized electrode body to the collector body.

In an alternative, the electron exposure may be conducted to a pair of collector bodies opposed to each other and including a polymer having no bridge structure therein and a conductive additive, a pair of polarized electrode bodies disposed on the respective collector bodies and including activated carbon powder or fibers and a polymer having no bridge structure therein, and a gasket sandwiched between the pair of collector bodies for sealing an electrolyte. In this case, the collector 22 may be bonded to the gasket having a polymer having no bridge structure therein by a bridge structure formed therebetween by the electron beam exposure.

The electron beam exposure is preferably conducted in the present invention at an acceleration voltage of 100 kV or more and a radiation dose of 1 mega-rad or more.

The polymer having no bridge structure therein may be selected from the group of polyethylene, a polypropylene, chloroprene rubber, butadiene rubber, acrylic rubber, acrylonitrile-butadiene rubber, ethylene propylene rubber isoprene rubber, styrene butadiene rubber (SBR), natural rubber, silicone rubber, ethylene-propylene copolymer, ethylenepropylene-diene copolymer, polyamide, polyester, polystyrene, chlorinated polyethylene, and a mixture of two or more of these materials.

The combination of the polarized electrode 21 and the collector 22 shown in FIG. 2 was manufactured as samples for a first embodiment of the present invention by the following process. Activated carbon powder shown by numeral 29 in FIG. 2, and olefin-based thermoplastic elastomer including PP-EPDM (polypropylene-ethylene-propylene-diene copolymer) having no bridge structure therein were mixed at a weight ratio of 60:40, shaped to form a 100-$\mu$m-thick sheet, and then punched therefrom to obtain the polarized electrode body having a 68×48 mm rectangular shape. The activated carbon powder used herein was prepared from a phenol resin by using a steam activation thereto. The thus obtained activated carbon powder had a specific surface area of 1500 m$^2$/gram and a mean grain size of 10 $\mu$m.

The collector body was formed by the steps of adding carbon black to olefin-based thermoplastic elastomer having no bridge structure therein for adding an electric conductivity, forming a 30-$\mu$m-thick sheet therefrom by shaping, and punching therefrom to form a 76×56 mm rectangular shape. The thus obtained collector body had a specific resistance of 0.1 $\Omega$-cm as measured in the direction parallel to the surface of the sheet by a 4-terminal method.

Figure 3:
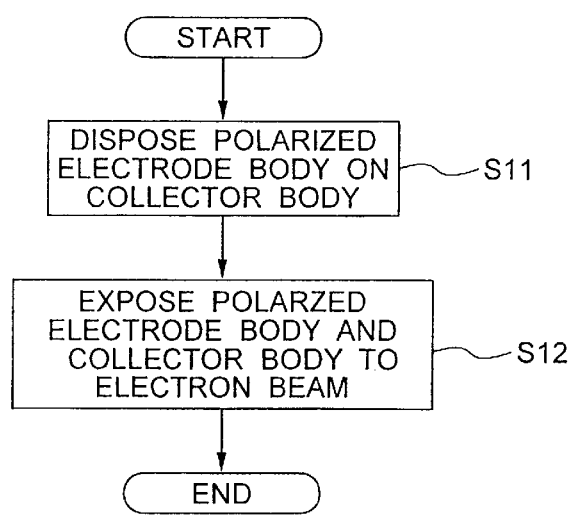
FIG. 3 is a flowchart of a process for fabricating the polarized electrode of FIG. 2 according to a first embodiment of the present invention.

FIG. 3 shows a flowchart for the subsequent fabrication steps. The polarized electrode body 21 and the collector body 22 are temporarily fixed together in step S11, with each edge of the polarized electrode body 21 disposed 4 mm apart from the corresponding edge of the collector body 22, by applying a pressure of 200 kilograms. Then, an electron beam exposure was conducted in step S12 at an acceleration energy of 1000 kV and a radiation dose of 5 mega-rad to form a bridge structure therebetween, thereby obtaining the structure of the polarized electrode 21 and the collector 22 bonded together by the bridge structure.

Figure 4:
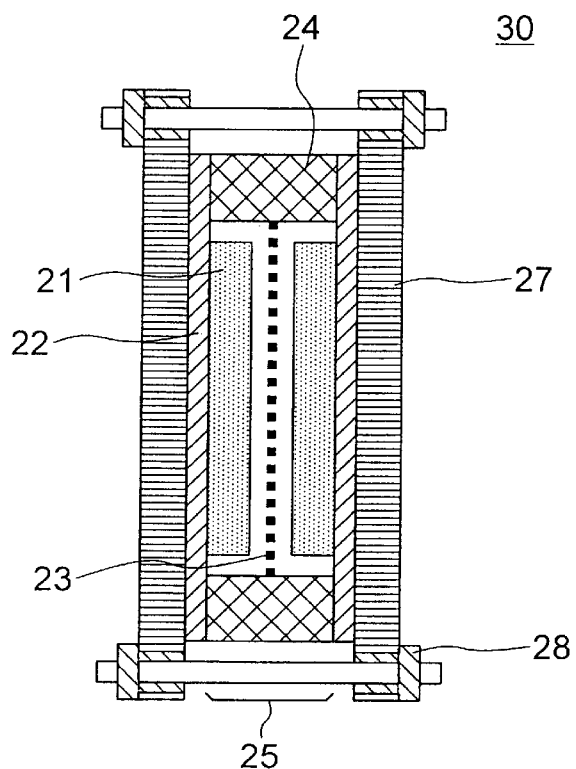
FIG. 4 is a sectional view of an electric double-layer capacitor manufactured by an embodiment of the present invention.

FIG. 4 shows an electric double-layer capacitor including the combination 20 of polarized electrode 21 and the collector 22 shown in FIG. 3. In fabrication of the electric double-layer capacitor 30, 30-wt % sulfuric acid was dropped in an amount of 0.3 cc while fixing the combination of the polarized electrode 21 and the collector 22, with the polarized electrode overlying the collector 22. Then, the ambient pressure was reduced to impregnate the polarized electrode 21 with the sulfuric acid. A separator 23 is made from a 50-$\mu$m-thick nonwoven fabric including polypropylene fibers which had been subjected to a hydrophilic treatment using a surface-active agent. The separator 23 was fabricated by dropping 30 wt % sulfuric acid solution in an amount of 0.2 cc for impregnating the nonwoven fabric with the sulfuric acid. A gasket 24 is of a frame shape which is 76×56 mm wide at the outer edge thereof, 70×50 mm wide at the inner edge thereof and 200 $\mu$m thick.

A pair of combinations 20 of polarized electrode 21 and collector 22 are adhered together, with the gasket 24 sandwiched between the outer peripheries of the collectors 22, to form a basic cell 25 of the electric double-layer capacitor of the present embodiment. The basic cell 25 is sandwiched between a pair of terminal plates 27 using a set of bolts and nuts. The terminal plates 27 were insulated from each other by insulating bushes 28 which insulate bolts from the terminal plates 27. The thus fabricated electric double-layer capacitor 30 had an operating voltage of 1 volt. The samples fabricated according to the first embodiment were fastened by bolts and nuts while different pressures, 0.5, 1.0, 2.0, 3.0, and 5.0 kg/cm2 were applied from both the terminal plates 27.

Figure 5:
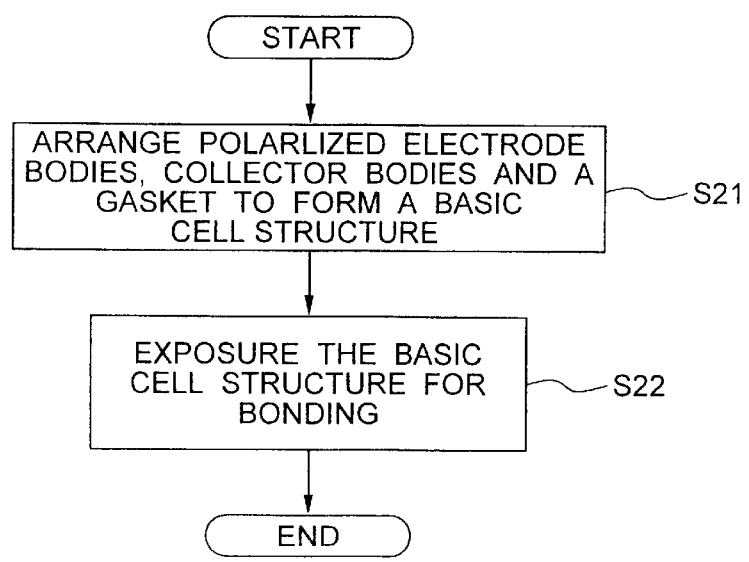
FIG. 5 is a flowchart of a process for fabricating the polarized electrode of FIG. 2 according to a second embodiment of the present invention.

The electric double-layer capacitor fabricated by a second embodiment of the present invention has a configuration similar to that fabricated by the method of the first embodiment. FIG. 5 shows a flowchart of the process for fabrication of the second embodiment. The polarized electrode bodies and the collector bodies in the samples for the second embodiment were coupled together, with the gasket 24 sandwiched therebetween, to form a basic cell structure 25. The basic cell structure was then subjected to an electron beam exposure to form a bridge structure between the polarized electrodes 21 and the collectors 22 and between the collectors 22 and the gasket 24 by using different acceleration energy levels. The acceleration energy levels were set at 500, 1000, 2000, and 5000 kV with the radiation dose set at 5 mega-rad.

Other samples for the second embodiment were also manufactured by coupling the polarized electrode and the collector, with the gasket 24 sandwiched therebetween in step S21, followed by an electron beam exposure using an acceleration energy of 1000 kV and radiation doses of 1, 10 and 50 mega-rad in step S22, with other conditions similar to those in the first embodiment. The thus obtained electric double-layer capacitors 30 having the structure shown in FIG. 4 had an operating voltage of 1 volt, which was similar to the first embodiment. The different acceleration energy levels were obtained by different electron beam exposure systems, whereas different radiation doses were achieved by iterative radiation steps each effected 1 mega-rad exposure of electron beam.

Figure 6:
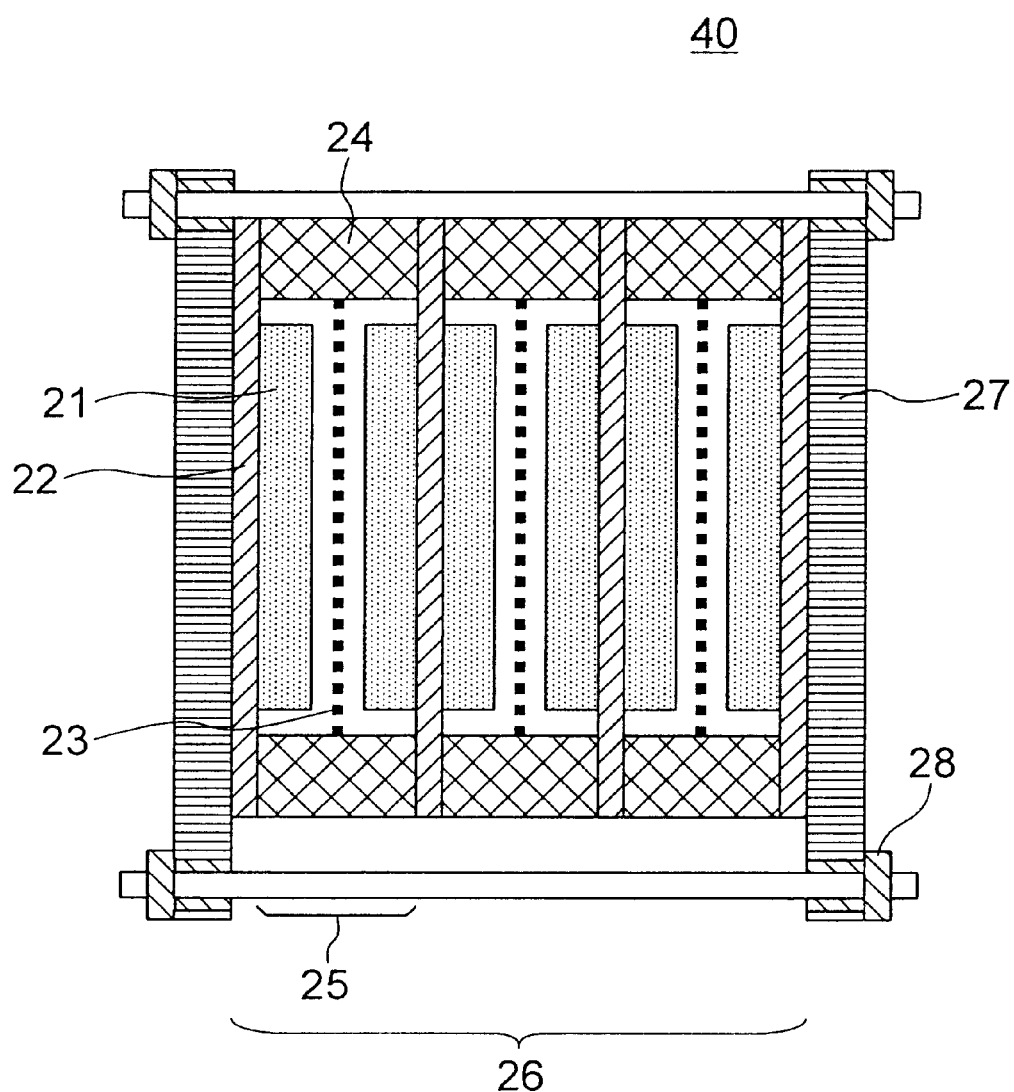
FIG. 6 is a sectional view of an electric double-layer capacitor manufactured by a method according to an embodiment of the present invention.

An electric double-layer capacitor, shown in FIG. 6, according to a third embodiment of the present invention has a cell structure 26 including three basic cells 25. A pair of combinations 20 of polarized electrode 21 and collector 22 such as shown in FIG. 2 were manufactured similarly to the first embodiment. Other combinations, each called herein a bipolar type, were also manufactured which included a single collector and a pair of polarized electrodes disposed on opposite surfaces of the collector.

Figure 7:
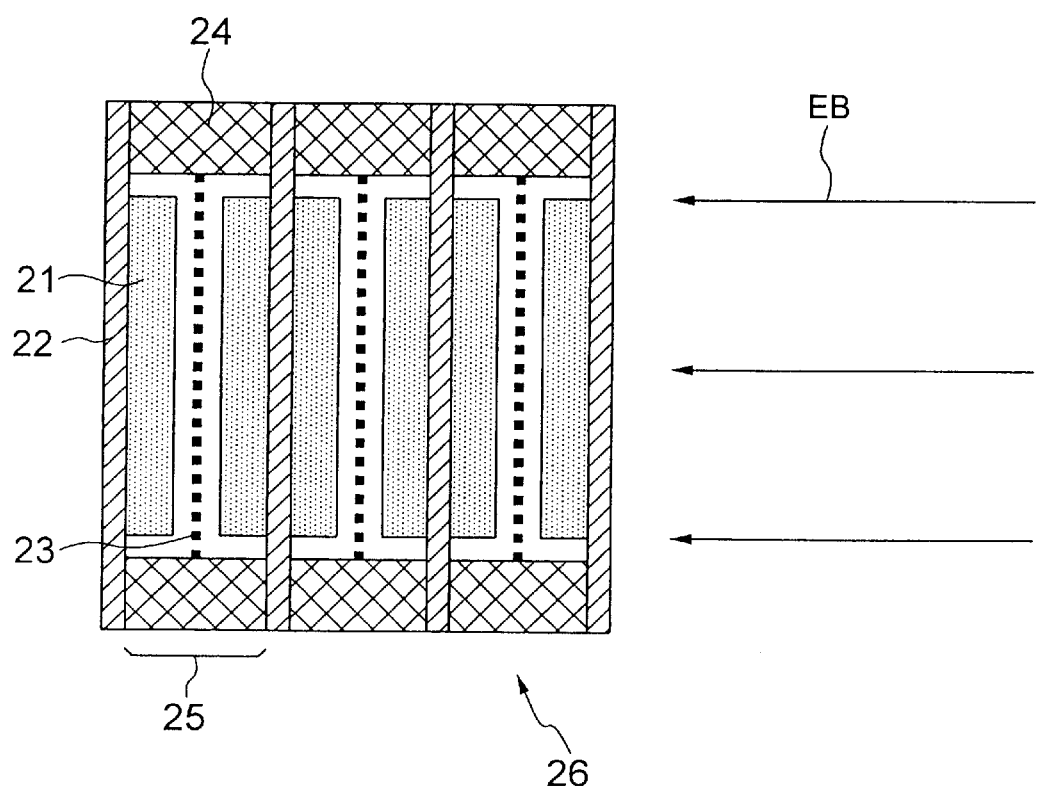
FIG. 7 is a sectional view of the cell structure of the electric double-layer capacitor of FIG. 6 during an electron beam exposure thereof.

The combinations thus manufactured were arranged to form the cell structure 26 shown in FIG. 6, wherein combinations 20 were disposed on the outer sides of the cell structure, whereas bipolar-type combinations were disposed internal to the cell structure 26. The cell structure 26 is subjected to an electron beam exposure in the direction normal to the surfaces of the collectors 22 and the polarized electrodes 21, as shown in FIG. 7, whereby bridge structures were formed between the polymer and the activated carbon in the polarized electrodes 21, polymer and the conductive additives in the collectors 22, between the polarized electrodes 21 and the collectors 22, and between the gaskets 24 and the collectors 22. Thus, the cell structure 26 including three serial basic cells 25 were obtained by a single electron beam exposure, or a one-second exposure, for example. This reduces the number of electron beam exposure steps and thus reduces the fabrication costs of the electric double-layer capacitor.

In the above embodiments, the materials for the polarized electrode 21 may further include carbon black as additives for the polymer and the activated carbon. A preferable ratio of carbon black to activated carbon is around 30:100 at a maximum. The fine particles of the carbon black reduces the contact resistance for the polarized electrode.

A comparative example was also manufactured which included activated carbon plates having a specific surface area of 1500 m²/gram and a mean grain size of 10 μm, and powdery phenol resin ("Bellpearl" in trademark from Kanebo Inc.) having a mean molecular weight of 10,000 or more, which were admixed at a weight ratio of 7:3 in a dry ambient. The admixed powder was thermally pressed at a temperature of 180° C., and then sintered at 900° C. in a non-oxidizing ambient to prepare an active carbon/polyacene composite body. The thus prepared composite body was cut to obtain polarized electrode sheets each having a size of 68×48 mm and a thickness of 0.1 mm.

The polarized electrode sheet was immersed in a 30 wt % sulfuric acid solution, and impregnated with sulfuric acid by reduction of the ambient pressure. The separator 23 was made from nonwoven fabric including polypropylene fibers and having a thickness of 50 μm, to which 30 wt % sulfuric acid was dropped in an amount of 0.2 cc for impregnation. The gasket 24 was made from ABS resin of a frame shape which was 76×56 mm wide at the outer edge thereof, 70×50 mm wide at the inner edge thereof, and 200 μm thick. These elements were arranged similarly to the first embodiment, and adhered by an epoxy resin to form a basic cell. The adhesion was conducted for one hour at a temperature of 70° C. A pair of terminal plates 27 were provided for sandwiching the basic cell 25 and fixed by bolts, nuts and insulating bushes 28, similarly to the first embodiment, whereby an electric double-layer capacitor 30 having an operating voltage of 1 volt was obtained.

A second comparative example was also fabricated wherein the polarized electrode 21 and the collector 22 were coupled by a bridge structure. In the fabrication, activated carbon powder and butyl rubber having no bridge structure therein were first admixed at a ratio of 60:40, followed by addition of bridging agent thereto and shaping thereof to form a 100-μm-thick sheet. The sheet body was punched to form a rectangular polarized electrode body of 68×48 mm size. The activated carbon powder body was fabricated similarly to the first embodiment.

In fabrication of the collector body, butyl rubber was added with carbon black to have electric conductivity, subjected to shaping to form a 30-μm-thick sheet, punched therefrom to form a rectangular collector body of 76×56 mm size. The collector body had a specific resistivity of 0.3 Ω-cm as measured by a 4-terminal method. The polarized electrode body was disposed on the collector body with each edge of the polarized electrode body being 4 mm apart from a corresponding edge of the collector body, and temporarily fixed thereto with a 200-kg thrust pressure. The combination was received in a thermostatic oven for three hours at a temperature of 120° C., thereby coupling the polarized electrode and the collector by a thermal vulcanization. The resultant combination was used to form an electric double-layer capacitor having an operating voltage of 1.0 volt, similarly to the first embodiment. The thrust pressure during fixing the basic cell between a pair of terminal plates was 0.5 kg/cm².

The embodiments and the comparative examples as described above were subjected to measurements of equivalent serial resistances (ESR) and capacitances thereof. The ESR was measured by applying an a.c. voltage of 10 mV and 1 kHz frequency across the electric double-layer capacitor without a d.c. bias voltage, and measuring the magnitude of the current and the phase difference thereof with respect to the applied voltage. The capacitance was measured by a constant-current discharge method, wherein the capacitors except for the third embodiment were applied with 1.0 volt, then discharged for 30 minutes, and measured with respect to the time interval Δt between the instants of 0.6 volt and 0.5 volt at the terminal voltage of the capacitors. The third embodiment was measured similarly to the rest of the capacitors except for the applied voltage, which was equal to the operating voltage 3.0 volts in the third embodiment, and for the terminal voltages for the measurements, which were 1.8 volts and 1.5 volts.

The capacitance "C" of the electric double-layer capacitor is expressed in terms of the current "I", the time interval Δt and the voltage difference ΔV as follows:

$$C = I \times \Delta t / \Delta V$$

Table-1 shows the results of the measurement for the samples and the comparative examples.

| | Acc. vol (KV) | Dose (Mrad) | Pres. (kg/cm²) | Op. vol (V) | ESR (mΩ) | Cap. (F) | Time (min.) |
|---|---|---|---|---|---|---|---|
| E.1-1 | 1000 | 5 | 0.5 | 1.0 | 5.1 | 23.4 | 5 |
| E.1-2 | 1000 | 5 | 1.0 | 1.0 | 4.9 | 23.5 | 5 |
| E.1-3 | 1000 | 5 | 2.0 | 1.0 | 4.8 | 23.6 | 5 |
| E.1-4 | 1000 | 5 | 3.0 | 1.0 | 4.8 | 23.7 | 5 |
| E.1-5 | 1000 | 5 | 5.0 | 1.0 | 4.7 | 23.4 | 5 |
| E.2-1 | 50 | 5 | — | — | — | — | — |
| E.2-2 | 100 | 5 | 0.5 | 1.0 | 5.2 | 23.7 | 5 |
| E.2-3 | 500 | 5 | 0.5 | 1.0 | 5.2 | 23.6 | 5 |
| E.2-4 | 1000 | 5 | 0.5 | 1.0 | 5.3 | 23.4 | 5 |
| E.2-5 | 2000 | 5 | 0.5 | 1.0 | 5.0 | 23.6 | 6 |
| E.2-6 | 5000 | 5 | 0.5 | 1.0 | 4.9 | 23.6 | 6 |
| E.2-7 | 1000 | 1 | 0.5 | 1.0 | 5.1 | 23.7 | 5 |
| E.2-8 | 1000 | 10 | 0.5 | 1.0 | 5.2 | 23.6 | 6 |
| E.2-8 | 1000 | 50 | 0.5 | 1.0 | 5.1 | 23.4 | 32 |
| E.3-1 | 1000 | 10 | 0.5 | 3.0 | 12.2 | 7.7 | 14 |
| C.E.1 | — | — | 5.0 | 1.0 | 8.2 | 27.4 | 60 |
| C.E.2 | — | — | 0.5 | 1.0 | 8.2 | 27.4 | 180 |

In Table-1, the symbols are as follows:

E.1-2: Second sample of the first embodiment, for example; C.E.: Comparative Example; Acc.V: Acceleration voltage; Dose; Radiation dose; Pres.; Pressure at fastening; Op.voltage: Operating voltage; Cap.: Capacitance; and Time: Time for bridging or bonding.

As understood from Table-1, the electric double-layer capacitor of the first comparative example has a larger capacitance compared to the samples for the embodiments and the second comparative example due to the large amount of activated carbon. The first sample for the first embodiment fastened with a pressure of 0.5 kg/cm² had a lower ESR compared to the second comparative example fastened with a pressure of 0.5 kg/cm². Although the first embodiment exhibited a somewhat lower ESR together with the increase of the fastening pressure, this fact is considered due to the reduction of the mechanical contact between the collector and the terminal plate, and the ESR itself was not affected by the fastening pressure.

In the second embodiment, the polarized electrode was peeled off from the collector at an acceleration-voltage of 50 kV, which revealed that 50 kV is not enough for the coupling between the polarized electrode and the collector. On the other hand, it was considered that a radiation dose of 1 mega-rad is sufficient for the coupling.

The third embodiment had a lower ESR compared to three times the ESR of the first sample of the first embodiment, which is considered due to the bipolar structure of the collector. Thus, it is considered that the third embodiment has substantially little difference between the same and the first embodiment.

In the results, the bridge structures formed by the electron beam exposure and by the thermal treatment have a significant difference therebetween in the electric characteristics of the capacitors. However, the electron beam exposure has a more significant advantage of small time length compared to the thermal bridging.

The combination of the polarized electrode and the collector used in the embodiments has the advantage of a higher resistivity against a high temperature, thus is suitable for a subsequent soldering step. In addition, the electron beam exposure improves the surface property of the polymer having no bridge structure therein before the exposure, by providing a hydrophilic property thereto.

The bridge structure formed between the polarized electrode and the collector functions for mechanical coupling therebetween and for reducing the contact resistance therebetween, and allows the external pressure for coupling to be reduced.

The bridging by the electron beam exposure reduces the time length for the coupling therebetween compared to the thermal bridging. The polymer as used in the embodiments may be selected from polymers having no bridge structure therein, the polymers having a property of bridging together with an electron beam exposure and a stable property against the electrolytic solution. The acceleration voltage and the radiation dose may be selected depending on the materials, thickness and the size thereof.

Since the above embodiments are described only for examples, the present invention is not limited to the above embodiments and various modifications or alterations can be easily made therefrom by those skilled in the art without departing from the scope of the present invention.

What is claimed is:

1. A method for manufacturing a polarized electrode for use in an electric double-layer capacitor, comprising the steps of admixing a polymer having substantially no bridge structure therein and activated carbon to obtain a mixture, and bridging the polymer and the activated carbon in the mixture by an electron beam exposure, wherein the polymer is selected from the group consisting of polyethylene, polypropylene, chloroprene rubber, butadiene rubber, acrylic rubber, acrylonitrile-butadiene rubber, ethylene propylene rubber, isoprene rubber, styrene butadiene rubber, natural rubber, silicone rubber, ethylene-propylene copolymer, ethylene-propylene-diene copolymer, polyamide, polyester, polystyrene, chlorinated polyethylene, and a mixture thereof.

2. The method as defined in claim 1, wherein the mixture includes the activated carbon in an amount of 50 to 95 wt % of the polymer.

3. The method as defined in claim 1, wherein the electron beam exposure uses an acceleration voltage of 100 kV or more and a radiation dose of 1 mega-rad or more.

4. A method for manufacturing an electric double-layer capacitor, comprising the steps of preparing a polarized electrode body including a first polymer having substantially no bridge structure therein and activated carbon, preparing a collector body including a second polymer having substantially no bridge structure therein and conductive additives, disposing the polarized electrode body on the collector body to form a combination, and exposing the combination to an electron beam to form a bridge structure at least between the polarized electrode body and the collector body, and fastening a plurality of the exposed combination, with electrolytic solution being disposed between each two of the combination, to form at least one basic cell of an electric double-layer capacitor.

5. The method as defined in claim 4, wherein the polarized electrode body includes the activated carbon in an amount of 50 to 95 wt % of the first polymer.

6. The method as defined in claim 4, wherein the collector body includes the conductive additive in an amount of 40 to 70 wt % of the second polymer.

7. The method as defined in claim 4, wherein the electron beam exposure uses an acceleration voltage of 100 kV or more and radiation dose of 1 mega-rad or more.

8. The method as defined in claim 4, wherein each of the first and second polymers is selected from the group consisting of polyethylene, polypropylene, chloroprene rubber, butadiene rubber, acrylic rubber, acrylonitrile-butadiene rubber, ethylene propylene rubber, isoprene rubber, styrene butadiene rubber, natural rubber, silicone rubber, ethylene-propylene copolymer, ethylene-propylene-diene copolymer, polyamide, polyester, polystyrene, chlorinated polyethylene, and a mixture thereof.

9. The method as defined in claim 4, wherein the electron beam exposure additionally exposes a gasket disposed between two of the collector bodies to form a bridge structure between the gasket and each of the two of the collector bodies.